Nov. 12, 1957  J. REFF  2,812,669
DEPRESSING AND HOLDING DEVICES FOR AUTOMOBILE
BRAKE PEDALS AND THE LIKE
Filed Sept. 17, 1956
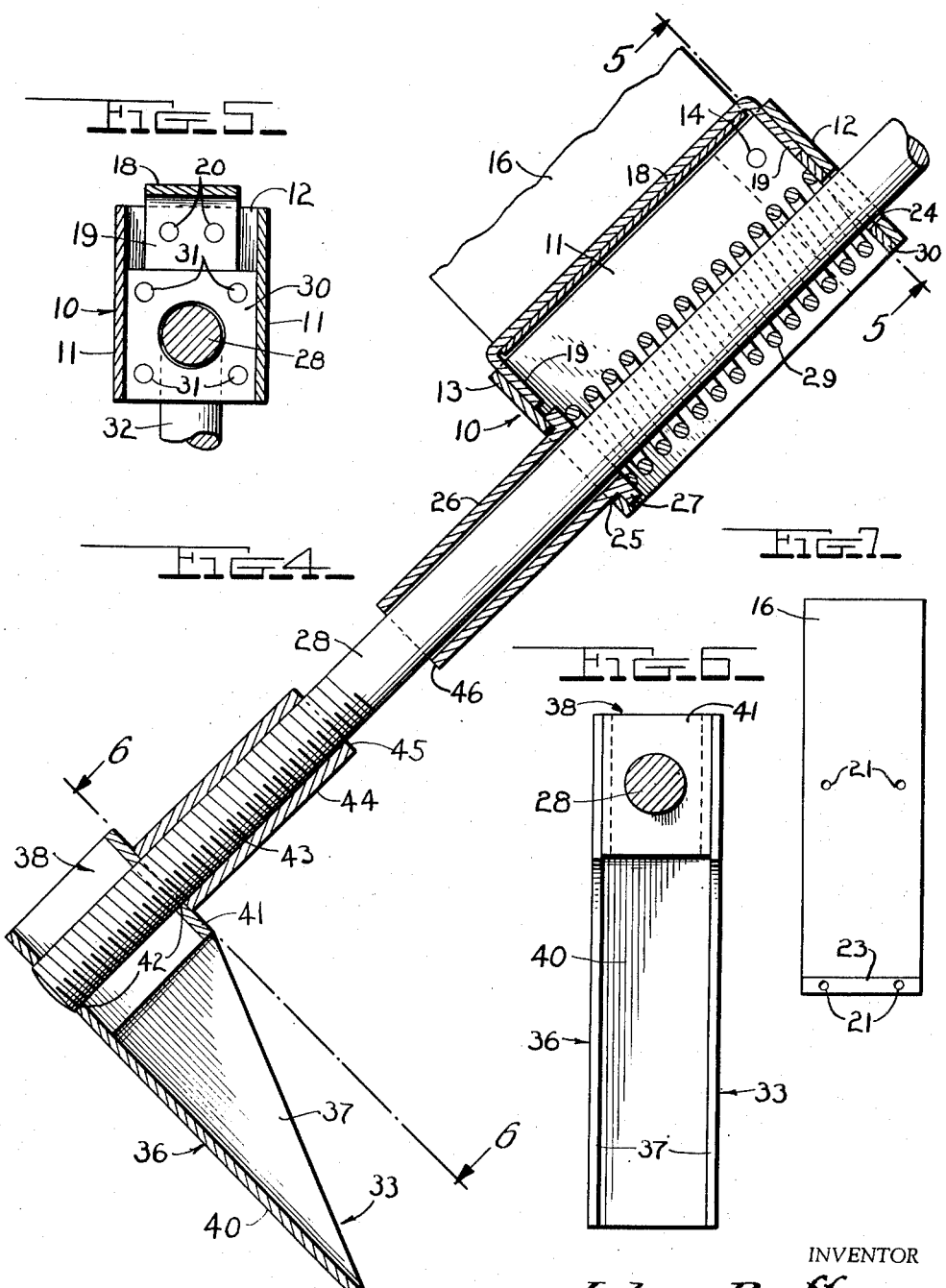
INVENTOR
John Reff
BY Roy A. Plant
ATTORNEY United States Patent Office 2,812,669
Patented Nov. 12, 1957

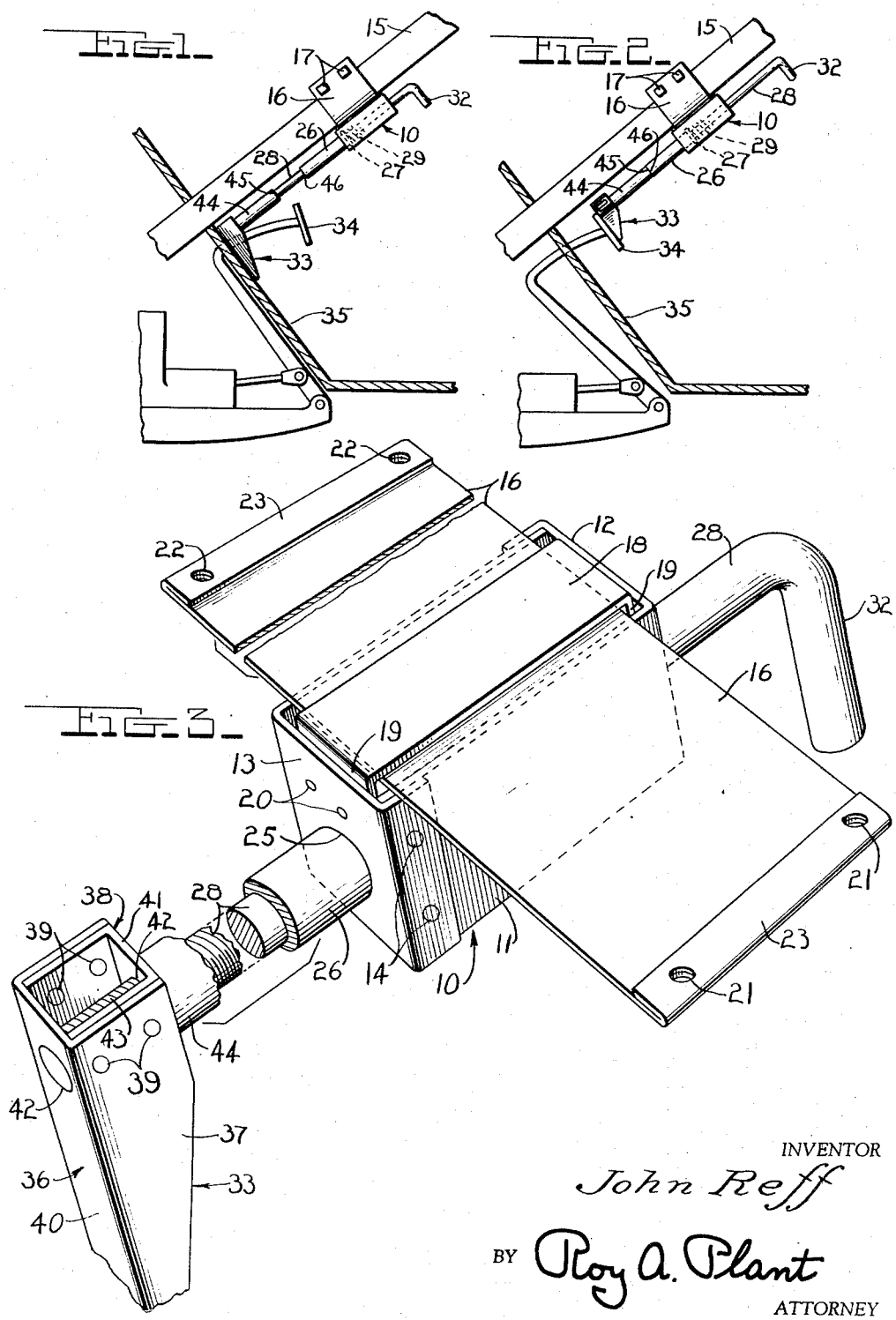

2,812,669

DEPRESSING AND HOLDING DEVICES FOR AUTOMOBILE BRAKE PEDALS AND THE LIKE

John Reff, Battle Creek, Mich.

Application September 17, 1956, Serial No. 610,346

6 Claims. (Cl. 74—532)

The present invention relates broadly to pressure applying apparatus, and in its specific phases to a depressing and holding assembly for an automobile brake pedal so that the ordinary four-wheel brakes can be availed of for holding the vehicle while parked.

The average hand brake on an automobile, while usually adequate for parking, only operates on two wheels and frequently will not hold the car on a steep incline or hill. This is not only very inconvenient but is often a serious hazard. Several efforts have been made to provide a loose jack-like means for extending from the automobile front seat to the brake pedal, or to apply some other form of non-resilient pressure on the brake pedal in an effort to take advantage of the foot brakes for holding the automobile while parked. It was a recognition of this problem and the lack of any wholly satisfactory solution to same, which led to the conception and development of the present invention.

Accordingly among the objects of the present invention has been the provision of a novel device which makes it possible to use the customary four-wheel brakes to prevent rolling of the car when it is parked, the device being usable as an adjunct to the hand brake or independently thereof.

Another object has been to provide a novel device which would be out of the way when not in use but always conveniently ready so that it could be easily moved to an operative position to hold the usual brake pedal depressed, when desired.

Another object has been to provide a device which will resiliently hold the brake pedal depressed by spring pressure, whereby a slow leak in the brake master cylinder or a wheel cylinder of a hydraulic brake system cannot discontinue the push of the device on the brake pedal and release the brakes for quite a long period of time.

A further object has been to provide the device in the form of a simple attachment easily clamped to the steering column of an automobile where it remains in fixed location ready for use at all times.

A further object has been to provide an exceptionally simple construction which is easy to use, and which can be expeditiously manufactured and profitably sold at a fair price.

Still further objects and advantages of the present invention will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but one of various ways in which the principle of the invention may be used.

In the annexed drawings:

Figure 1 is a partial elevation and a partial section showing the invention applied to an automobile but occupying normal position.

Figure 2 is a similar view but showing the device in operative position to hold the brake pedal depressed.

Figure 3 is a perspective view, partly broken away, showing the relation of the body of the device with the attaching strap prior to bending this strap around the steering column and bolting it in place.

Figure 4 is a fragmentary longitudinal sectional view showing the relation of elements when the device is idle.

Figures 5 and 6 are, respectively, transverse sectional views on lines 5—5 and 6—6 of Figure 4, looking in the direction of the arrows.

Figure 7 is a plan view showing the form in which the attaching strap is preferably manufactured.

Preferences in connection with the brake pedal depressor and holder have been disclosed in the drawings, and will be rather specifically described, but attention is invited to the possibility of making variations within the spirit and scope of the invention as herein shown, described, and claimed.

An elongated body is shown, in the form of an elongated rectangular frame 10, said frame having parallel vertical side plates 11, an upper end plate 12 and a lower end plate 13. The frame 10 is preferably formed from two L-shaped metal stampings spot-welded together at 14.

The frame 10 is intended to occupy a position behind the steering column 15 of an automobile; and a metal attaching strap 16 and bolts 17 are provided for mounting said casing. The strap 16 extends in front of the frame 10 and the latter is provided with a bar 18 to lie against the front side of said strap 16, the ends of said bar being turned rearwardly at 19 and its end portions spot-welded at 20 to the end plates 12 and 13. After inserting the strap 16 between the bar 18 and frame 10, as seen in Figure 3, said strap is bent around the steering column 15 and the ends of said strap are connected by the bolts 17, thereby tightly clamping and anchoring the frame 10 in place.

Preferably, the strap 16 is manufactured in the form shown in Figure 7 and of sufficient length for engagement with the largest steering column used. The strap is formed with four bolt holes 21, as shown in Figure 7, positioned to properly engage the bolts 17 when the device is to be mounted on a steering column of average size, the excess at one end of the strap being cut off. For a larger steering column, two additional bolt holes 22, Figure 3, may be formed in the strap for coaction with two of the bolt holes 21 in receiving the bolts 17. If desired, the end portions of the strap may be folded upon themselves at 23 for reinforcement.

The upper end plate 12 of the frame 10 is formed with an opening 24, Figure 4, and the lower end plate 13 has a somewhat larger opening 25, these two openings being aligned. A sleeve 26 extends slidably through the opening 25 and has a stop shoulder 27 at its rear end and normally abutting the inner face of end plate 13. A rod 28 extends slidably through the sleeve 26 and the opening 24 and is much longer than the frame 10. This rod is surrounded by a coiled compression spring 29 which acts downwardly against the lower end plate 13, through stop shoulder 27 of sleeve 26, and reacts against the upper end plate 12, thereby normally holding said sleeve 26 in the lowered position of Figures 1 and 4.

Preferably, a washer plate 30, Figures 4 and 5 is interposed between the spring 29 and the upper end plate 12, said washer plate and end plate being spot-welded together as at 31.

The upper end of the rod 28 is bent laterally to provide a handle 32 and the lower end of said rod is provided with a lateral foot 33 for engagement with the brake pedal 34 when the latter is to be held depressed, Figure 2, to hold the automobile foot brakes, normally four-wheel brakes in most automobiles, applied for parking. Ordinarily, however, the foot 33 rests on the foot board 35, Figure 1, of the automobile, when not in use, and in this position is entirely out of the driver's way.

The foot 33 is preferably constructed and attached to the rod 28, as shown in Figures 3 and 4. A channel-shaped sheet metal stamping 36 has its side flanges 37 tapered toward the toe of the foot; and a U-shaped stamping 38 is welded at 39 between said side flanges 37 at the heel of the foot. The flange-connecting portion 40 of the stamping 36, and the arm-connecting portion 41 of the stamping 38 are formed with aligned openings 42 through which the lower end of the rod 28 is threaded. The thread 43 of this rod extends upwardly beyond the foot 33; and a sleeve 44 is threaded on this extended thread. The lower end of this sleeve 44 tightly abuts the arm-connecting portion 41 of the stamping 38 and the sleeve thus acts as a lock nut. The upper end 45 of the sleeve 44 constitutes a shoulder to abut the lower end 46 of the slidable sleeve 26 when the rod 28 is pulled upwardly by the handle 32. By having foot 33 and sleeve 44 threaded on rod 28 the position of the foot 33 relative to handle 32 can be adjusted, as desired, and moreover this threaded construction makes possible the disassembly of the apparatus when desired.

The attachment is mounted as seen in Figures 1 and 2 and the foot 33 normally rests on the foot board 35 as shown in Figure 1. The sleeve 26 is then held in its lowermost position, Figures 1 and 4, by the spring 29. When the device is to be used, the brake pedal 34 is depressed to apply the brakes, and the rod 28 is then pulled upwardly. This causes the sleeve 44 to strike the lower end of sleeve 26, thereby sliding the latter upwardly and compressing the spring 29. When the foot 33 is somewhat above the pedal 34, the handle 32 is turned to turn the rod 28 and swing said foot into position, such that when released, it will abut the upper face of said pedal, as seen in Figure 2.

The handle 32 is then released and the driver removes his foot from the pedal 34. Spring 29 then acts on the sleeves 26 and 44 and the foot 33, causing the latter to hold the pedal 34 in brake-applied position. The device is released by the driver placing his foot on pedal 34 to hold same depressed, and then pulling and turning the handle 32 to free the foot 33 from the pedal 34, following which the rod 28 is slid downwardly until said foot again rests idly on the foot board 35.

From the foregoing, it will be seen that a novel and advantageous construction for holding a brake pedal, or the like, depressed, has been disclosed and which is particularly adapted for attaining the desired ends. However, attention is again invited to the possibility of making variations without departing from the spirit and scope of the invention as herein set forth and claimed. The directional terms such as "below," "upper," "lower," "downward," and "lowermost" have been used to facilitate describing the invention and are to be considered as relative only, and not limiting on the construction involved.

Other modes of applying the principle of my invention may be employed instead of the one explained, change being made as regards the article and combinations herein disclosed, provided the means stated by any of the following claims or the equivalent of such stated means be employed.

I therefore particularly point out and distinctly claim as my invention:

1. An automobile brake pedal depressor and holder comprising a body and means for mounting it on a steering column, said body having a lower bearing and an upper bearing in axial alignment with each other, a sleeve slidable in said lower bearing, means for limiting the downward movement of said sleeve in said lower bearing, spring means acting against said sleeve and reacting against said body for yieldably holding said sleeve in its lowermost position, a slidable and turnable rod extending through said sleeve and said upper bearing, the upper end of said rod having a handle by means of which it may be pulled and turned, and a lateral foot secured to the lower end of said rod in position to normally rest on the automobile foot board, said rod having a shoulder normally spaced below the lower end of said sleeve, said shoulder being positioned to strike said sleeve and slide the latter upwardly to stress said spring means when said rod is pulled upwardly, whereupon turning of said rod may then dispose said foot on the automobile brake pedal to hold the latter depressed through pressure exerted by said spring when said handle is released.

2. A structure as set forth in claim 1; said body comprising a frame having longitudinal side members and end members, said end members having openings constituting said bearings.

3. A structure as set forth in claim 1; said body comprising a frame having longitudinal side members and end members, said end members having openings constituting said bearings, said mounting means comprising a strap to straddle the steering column and means for connecting the ends of said strap to bind same on said steering column, and a bar extending transversely of said strap to connect it with said frame, said bar having laterally bent ends secured to said end members of said frame.

4. A structure as set forth in claim 1; said foot being threaded on said rod, and a second sleeve threaded on said rod and tightly abutting said foot, the upper end of said second sleeve constituting said shoulder adapted to abut the end of said sleeve slidably fitting the lower bearing of said body.

5. A structure as specified in claim 1; said foot comprising a longitudinally channeled metal stamping having parallel side flanges and a flange-connecting portion, the end of this portion at the heel of the foot being provided with an opening, and a U-shaped metal stamping at said heel of said foot and secured to said side flanges, said U-shaped stamping having an arm-connecting portion opposed to the aforesaid flange-connecting portion of said channel stamping, said arm-connecting portion having an opening aligned with the aforesaid opening in said channeled stamping, the lower end of said rod being secured in said openings.

6. A structure as set forth in claim 1; said foot comprising a longitudinally channeled metal stamping having parallel side flanges and a flange-connecting portion, the end of this portion at the heel of the foot being provided with an opening, and a U-shaped metal stamping at said heel of said foot and secured to said side flanges, said U-shaped stamping having an arm-connecting portion opposed to the aforesaid flange-connecting portion of said channeled stamping, said arm-connecting portion having an opening aligned with the aforesaid opening in said channeled stamping, the lower end of said rod being threaded through said openings, and a second sleeve threaded on said lower end of said rod and tightly abutting the outer side of said arm-connecting portion of said U-shaped stamping, the upper end of said second sleeve constituting the aforesaid shoulder adapted to abut the end of said sleeve slidably fitting the lower bearing of said body.

References Cited in the file of this patent

UNITED STATES PATENTS

| 1,681,380 | Taman | Aug. 21, 1928 |

FOREIGN PATENTS

| 21,082 | Australia | Jan. 25, 1935 |